Oct. 29, 1929.   W. P. BONNELL, SR   1,733,719
HANDLE FOR POT COVERS
Filed Aug. 23, 1928
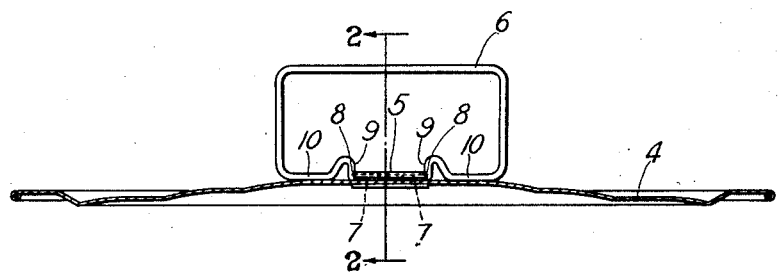
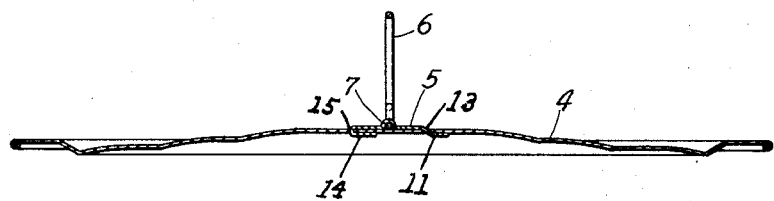
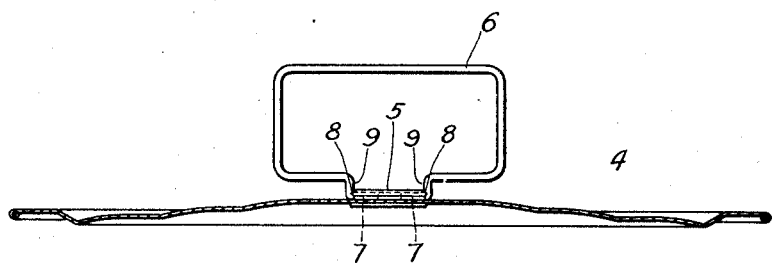
WILLIAM P. BONNELL, Sr.
INVENTOR.
BY
Mason Fenwick & Lawrence
ATTORNEYS.

Patented Oct. 29, 1929

1,733,719

UNITED STATES PATENT OFFICE

WILLIAM P. BONNELL, SR., OF PHILADELPHIA, PENNSYLVANIA, ASSIGNOR TO THE CENTRAL STAMPING COMPANY, OF NEWARK, NEW JERSEY, A CORPORATION OF NEW YORK

HANDLE FOR POT COVERS

Application filed August 23, 1928. Serial No. 301,611.

My invention relates to handles for the covers of pots and pans of the general class of that shown in United States patent to A. N. Kimberly, No. 999,315. In this class of handles the inturned ends of the bail are pivoted in the ends of a tube secured usually by a clip or clips to the cover, and the ends of the tube are notched to hold the bail yieldingly erect, while permitting it to be folded flat against the cover.

Owing to the necessary width of the bail and tube, it has generally been necessary, as in the above patent illustration, to provide a pivotal tube for the full length of the bail, the side members of the bail acting to engage the notches in the ends of the tube.

Further it has usually been the practice to bend both parts of the tube clip inserted through the cover inward against the cover to secure the tube to the cover.

My invention consists in using a short notched tube for the middle parts only of the inturned bail ends, and in bending upward said bail ends to form shoulders to engage the notches in the ends of the shortened tube, so as to simplify and cheapen its construction.

My invention also consists in attaching the clip to the cover by bending one part only inserted through the cover slit against the cover, the other part being previously inserted through the slit parallel to the cover to the same end—economy in manufacture.

In order that my invention may be fully understood, I shall first describe in detail the mode in which I at present prefer to carry this invention into practice, and then particularly point out the invention in the claims.

Reference is to be had to the accompanying drawings forming part of this application for patent, in which like parts are designated by the same numbers in all the figures.

Figure 1 is a sectional side view of a pot cover provided with a handle embodying my invention.

Figure 2 is a cross sectional view of the same on the line 2—2, Figure 1.

Figure 3 is a sectional side view showing a modification.

In Figures 1 and 2, 4 designates the cover, 5 the tube attached thereto, 6 the bail, the inturned ends 7 of which are pivoted to turn in the ends of the tube, and 8 the notches in the ends of the tube to hold the bail yieldingly erect, while permitting it to be folded flat against the tube as described in the prior patent to Kimberly referred to.

Instead of using a long tube extending the full length of the bail, I use a short tube 5 extending over only the middle parts of the bail ends 7, and bend said bail ends 7 upward or outward at a right angle to form shoulders 9, which engage the notches 8 in the ends of the tube, and serve to hold the bail yieldingly erect, while permitting it to be folded flat against the cover.

This greatly simplifies and cheapens the manufacture and the attachment of the bail to the cover.

As the outer parts of the bail ends 7 are thus raised above the cover when the bail is erect, I generally prefer to steady the bail on the cover by bending the bail ends outside the shoulders 9, downward or inward again to form legs 10, which rest on the cover and support the ends of the bail when erect.

In attaching the tube to the cover I generally but not always prefer to leave one part 11 of the tube clip 12 unbent and insert it through its cover slit 13 parallel to the cover, and then insert the other part 14 of the clip through its slit 15, and bend it flat against the bottom of the cover.

This also simplifies, facilitates, and cheapens the manufacture and the attachment of the tube and bail to the cover.

In Figure 3 I have shown the bail 6 with the notch-engaging shoulders 9, but without the steadying and supporting legs 10, as an alternative construction.

It is evident that other changes may be made in the details of my invention without departing from the boundaries of my invention as defined by the following claims.

I claim as my invention:

1. A pot and pan cover having a short tube attached on its side thereto, and formed with end notches, and a bail having its inner ends bent inwardly toward and in lie with each other, said inwardly bent ends being bent downwardly parallel with each other to form notch-engaging shoulders, and then again inwardly in line with each other, said latter inwardly bent ends being inserted in the opposite ends of the tube, and the downwardly bent shoulder portions engaging yieldingly the notches in the opposite ends of the tube.

2. A pot and pan cover in accord with claim 1 in which the aligned inwardly bent ends of the bail are bent upwardly about parallel with each other, then downwardly about parallel with each other and then inwardly in line with each other, and inserted in the notched ends of the tube.

In testimony whereof I affix my signature.

WILLIAM P. BONNELL, Sr.